United States Patent
Kato et al.

(10) Patent No.: US 7,415,751 B2
(45) Date of Patent: Aug. 26, 2008

(54) TIGHTENING STRUCTURE FOR ASSIST GRIP

(75) Inventors: Yoshiaki Kato, Kasugai (JP); Takahide Ichimaru, Chigasaki (JP)

(73) Assignees: Howa Textile Industry Co., Ltd., Kasugai-shi (JP); Nifco Inc., Yokohama-shi (JP)

( * ) Notice: Subject to any disclaimer, the term of this patent is extended or adjusted under 35 U.S.C. 154(b) by 0 days.

(21) Appl. No.: 10/558,740

(22) PCT Filed: Jun. 2, 2004

(86) PCT No.: PCT/JP2004/008013

§ 371 (c)(1),
(2), (4) Date: Sep. 11, 2006

(87) PCT Pub. No.: WO2004/108473

PCT Pub. Date: Dec. 16, 2004

(65) Prior Publication Data

US 2007/0102944 A1    May 10, 2007

(30) Foreign Application Priority Data

Jun. 3, 2003    (JP)    ............................. 2003-157974

(51) Int. Cl.
*B60J 3/02*    (2006.01)

(52) U.S. Cl. ........................ 24/289; 296/1.02; 16/110.1; 16/DIG. 24

(58) Field of Classification Search ........... 24/289–297, 24/581.11, 580.11, 578.1, 573.09, 607; 16/110.1, 16/DIG. 14, DIG. 24; 269/214, 1.02
See application file for complete search history.

(56) References Cited

U.S. PATENT DOCUMENTS

| | | | | |
|---|---|---|---|---|
| 5,507,545 A | * | 4/1996 | Krysiak | ..................... 296/97.9 |
| 5,662,375 A | * | 9/1997 | Adams et al. | ............... 296/214 |
| 6,364,589 B1 | * | 4/2002 | Wenglinski | .................. 411/508 |
| 6,406,242 B1 | * | 6/2002 | Gordon | ....................... 411/508 |
| 6,428,089 B1 | * | 8/2002 | Noda | .......................... 296/214 |
| 6,715,812 B2 | * | 4/2004 | Sakuma et al. | ............. 296/1.02 |

FOREIGN PATENT DOCUMENTS

| | | |
|---|---|---|
| DE | 4309024 | 9/1994 |
| JP | 04-300742 | 10/1992 |
| JP | 08-085376 | 4/1996 |
| JP | 2002-227815 | 8/2002 |

* cited by examiner

*Primary Examiner*—Robert J Sandy
(74) *Attorney, Agent, or Firm*—Oblon, Spivak, McClelland, Maier & Neustadt, P.C.

(57) ABSTRACT

A tying structure for an assist grip is intended for tying a base member supporting the assist grip swingably thereon to a car body panel with a clip and an engaging member. The clip is provided with first engaging parts for engagement with the base member and second engaging parts for engagement with the car body panel. The first engaging parts are provided in a part thereof penetrating the base member in the outside-inside insertion direction and protruding toward a front side the base member with a through hole penetrating the part in a direction orthogonal to the insertion direction. The engaging member is provided with an engaging part inserted into the through hole and enabled to prevent the base member from slipping off the clip and a cover covering the front side of the base member.

4 Claims, 10 Drawing Sheets

TIGHTENING STRUCTURE FOR ASSIST GRIP

TECHNICAL FIELD

This invention relates to a tying structure for an assist grip which ties a base member supporting an assist grip swingably thereon to a car body panel with a clip and an engaging member.

BACKGROUND ART

The conventional tying structure for an assist grip which ties a base member supporting an assist grip swingably thereon to a car body panel is so constructed as to fix the base member to the car body panel with a mounting screw (as disclosed in JP-A HEI 8-85376 ([0003], [0018], FIG. 2 and FIG. 6, for example).

Further, the tying structure for an assist grip which ties a base member simply fixing the assist grip to a car body panel is so constructed as to fix the base member to the car body panel with a mounting screw (as disclosed in JP-A HEI 4-300742 ([0003], [0013], FIG. 4 and FIG. 5, for example).

Since the conventional tying structure for an assist grip fixes the base member to the car body panel with the mounting screw, it has been incapable of performing the work of tying the base member with satisfactory workability or with high operational efficiency.

This invention has been initiated with the object of solving the inconveniences of the prior art mentioned above and is aimed at providing a tying structure for an assist grip which is capable of highly reliably tying a base member to a car body panel with high operational efficiency without either requiring use of such a jig as is needed when a screw is indispensable or necessitating management of tightening torque.

DISCLOSURE OF THE INVENTION

This invention provides a tying structure for an assist grip which ties a base member supporting the assist grip swingably thereon to a car body panel with a clip and an engaging member, the clip being provided with a first engaging part for engagement with the base member and a second engaging part for engagement with the car body panel, the first engaging part being provided in a part thereof penetrating the base member in an outside-inside insertion direction and protruding toward a front side of the base member with a through hole penetrating the part in a direction orthogonal to the insertion direction, and the engaging member being provided with an engaging part inserted into the through hole and enabled to prevent the base member from slipping out of the clip and a cover concealing the front side of the base member.

Then, this invention embraces a case where the second engaging part is formed of a plurality of elastic pieces each diverging from a proximal terminal to a distal terminal, the clip is furnished with retaining parts for retaining a protruding part thrust toward a rear side of the base member and a case where the retaining parts are provided with a regulating part for regulating motion of the protruding part.

Further, this invention embraces a case where the engaging member is provided with a removing part for removing itself from the clip and a case where the clip is made of a metallic material.

The tying structure according to this invention is so constructed as to tie the base member supporting the assist grip swingably thereon to the car body panel by causing the clip fixing the base member with the engaging member to engage the car body panel as described above. Thus, it is capable of performing the work of highly reliably tying the base member with high operational efficiency without either requiring use of such a jig as is needed when a screw is indispensable or necessitating management of tightening torque.

BEST MODE FOR CARRYING OUT THE INVENTION

With reference to FIG. 1 to FIG. 6, a base member made of synthetic resin which is denoted by 11 is composed of a base part 12, a protruding part 13 thrust from the right side (the rear side as mentioned in the scope of claim for patent) of the base part 12, a perimetric wall part 14 thrust to the right side of the base part 12 so as to encircle the protruding part 13 and assuming a square shape as viewed on the right side surface, a flange part 15 perimetrically connected to the left side (the front side as mentioned in the scope of claim for patent) surface of the base part 12, a pair of supporting wall parts 16, 16 connected in parallel before and after the left side of the flange part 15, a planar part 17 interposed between the supporting wall parts 16, 16, and a front surface plate part 18 connected to the pair of supporting wall parts 16, 16 and the planar part 17 at the left terminal between the supporting wall parts 16, 16 and on the lower side of the planar part 17 and adapted to cover the interval between the pair of supporting wall parts 16, 16.

The base part 12 is provided with a pair of through holes 12a, 12a positioned above and below the protruding part 13 assuming the shape of an oblong tetragonal column and adapted to allow a pair of first engaging parts 23, 23 of a clip 21 which will be described more specifically afterward to penetrate in the bilateral direction and a rectangular opening part 12b positioned on the lower side of the lower through hole 12a, opened toward the lower side and adapted to close the lower side with the flange part 15.

Incidentally, of the pair of through holes 12a, 12a, the through hole 12a on the upper side has the central part thereof formed in an upwardly thrust convex shape as viewed on the left side and the through hole 12a on the lower side has the central part thereof formed in a downwardly thrust convex as viewed in the left side surface and the two through holes 12a, 12a are both interposed between the protruding part 13 and the perimetric wall part 14.

Next, the protruding part 13 is formed in a shape having the right side part thereof constricted toward the right side and is provided in the central part of the right terminal surface thereof with a projection 13a of the shape of a tetragonal column thrust toward the right side, inserted in the through hole 22a of the clip 21 and retained so as not to move.

Then, the perimetric wall part 14 has the laterally central part thereof connected to the protruding part 13 and is provided in the vertically central part thereof with concave parts 14a, 14a adapted to allow insertion therethrough of second engaging parts 24, 24 of the clip 21.

The pair of supporting wall parts 16, 16 are formed each in an arcuate surface having the upper plane descend toward the left, provided between themselves and the base part 12 on the lower side with concave parts 16a, 16a having the upper terminals thereof serve as parts for regulating the rotation of an assist grip 41 which will be more specifically described afterward, and further provided in the lower terminal parts on the left sides of the concave parts 16a, 16a with shaft supporting holes 16b, 16b supporting the assist grip 41 rotatably and serving to mount a supporting shaft 51 which will be more specifically described afterward.

The planar part 17 has connected thereto a supporting wall 17a of the shape of three sides of a square as viewed in the plan view and opened toward the flange part 15 side so as to support the first engaging part 23 on the lower side from below by virtue of collision and is provided as well in the part enclosed with the flange part 15 and the supporting wall 17a with a through hole 17b of a tetragonal shape.

With reference to FIG. 1 and FIG. 7 to FIG. 10, a clip made of a metallic (planar) material which is denoted by 21 comprises a basal part 22 assuming a rectangular shape long sideways as views on the left side surface, the first engaging parts 23, 23 extended toward the left side above and below the basal part 22 and inserted through the through holes 12a, 12a of the base member 11 from right to left, the second engaging parts 24, 24 formed by partly cutting and raising the first engaging parts 23, 23, diverged from the proximal terminal (basal part 22 side) to the distal terminal (side) and allowed to engage with a car body panel 61 which will be more specifically described afterward, and third engaging parts 25, 25 extended toward the left side from before and after the basal part 22 until collision with the inner side (front side) of the car body panel 61.

Incidentally, the retaining part which retains the protruding part 13 of the base member 11 comprises the basal part 22, first engaging parts 23, 23 and third engaging parts 25, 25.

The basal part 22 is provided with a through hole 22a serving as a regulating part for regulating the motion of the protruding part 13 in the vertical and bilateral directions in consequence of the insertion therein of the projection 13a of the protruding part 13.

Then, the first engaging parts 23, 23 are provided respectively in the parts allowing them to protrude toward the left side after having penetrated the through holes 12a, 12a of the base member 11 in the bilateral directions with through holes 23a, 23a having the same tetragonal shape as the through hole 17b and extended in a direction orthogonal to the insertion direction and stress receiving pieces 23b, 23b positioned on the distal terminal sides of the through holes 23a, 23a and formed by partly folding the first engaging parts 23, 23.

Here, the outside-inside direction or the bilateral direction mentioned in the scope of claim for patent constitutes an outside-inside direction of the car compartment and the front side constitutes the inner side of the compartment.

Incidentally, the upper stress receiving piece 23b is bent toward the upper side so as to allow insertion of part of the upper first engaging part 23 into the upper through hole 12a and the lower stress receiving protruding piece 23b is bent toward the lower side so as to allow insertion of part of the lower first engaging part 23 into the lower through hole 12a and the individual stress receiving pieces 23 are enabled to reinforce the first engaging part 23 and, at the same time, render an engaging part 32 of an engaging member 31 which will be more specifically described afterward difficult to bend on colliding.

Then, the second engaging parts 24, 24 are each formed of an elastic piece 24a diverged from the proximal terminal (on the side of basal part 22) to the distal terminal (side) and provided at the distal terminal thereof with an engaging part 24b adapted to engage the car body panel 61.

The third engaging parts 25, 25 are each formed of an elastic piece 25a extended toward the left side before and after the basal part 22 and furnished at the distal terminal thereof with a colliding part 25b bent toward the outer side so as to collide with the inner side (front side) of the car body panel 61.

With reference to FIG. 1 and FIG. 11 to FIG. 15, the engaging member 31 is made of synthetic resin and comprises the engaging part 32 of the shape of a tetragonal tube, a cover 33, an engaging piece 34 formed by utilizing the right surface side wall of the engaging part 32, and a removing part 35. The engaging part 32 is opened upward, inserted in the through holes 23a, 23a of the clip 21 and the through hole 17b of the base member 11 and enabled to prevent the base member 11 from slipping from the clip 21. The cover 33 is connected to the engaging part 32 so as to hang obliquely down from the upper terminal of the engaging part 32 to the left side, allowing the lower side surface thereof to collide against the upper surfaces of the pair of supporting wall parts 16, 16 and the front surface planar part 18 of the base member 11, allowing the right terminal surface thereof to collide against the left side surface of the flange part 15 and adapted to conceal the interval between the pair of supporting wall parts 16, 16. The engaging piece 34 is allowed to engage with the lower surface of the first engaging part 23 on the upper side of the clip 21 and enabled to prevent the engaging part 32 from slipping off. The removing part 35 is connected to the upper side of this engaging piece 34 at a level not protruding from the engaging part 32, namely falling flush with the surface of the engaging part 32, and intended to remove the engaging member 31 from the clip 21.

Figure 16:
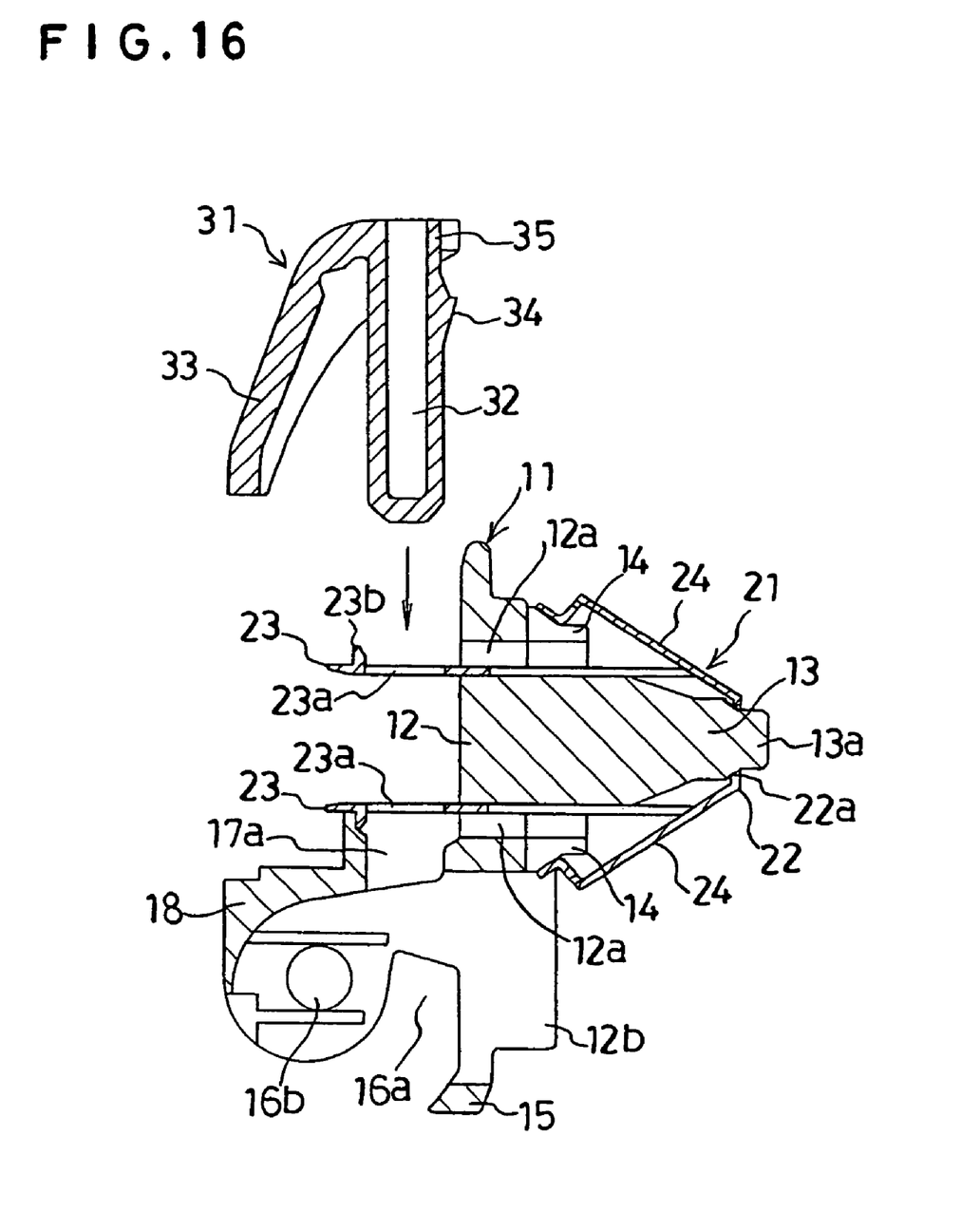
FIG. 16 is an explanatory diagram depicting a method for assembling the base member, the clip, and the engaging member.
Figure 17:
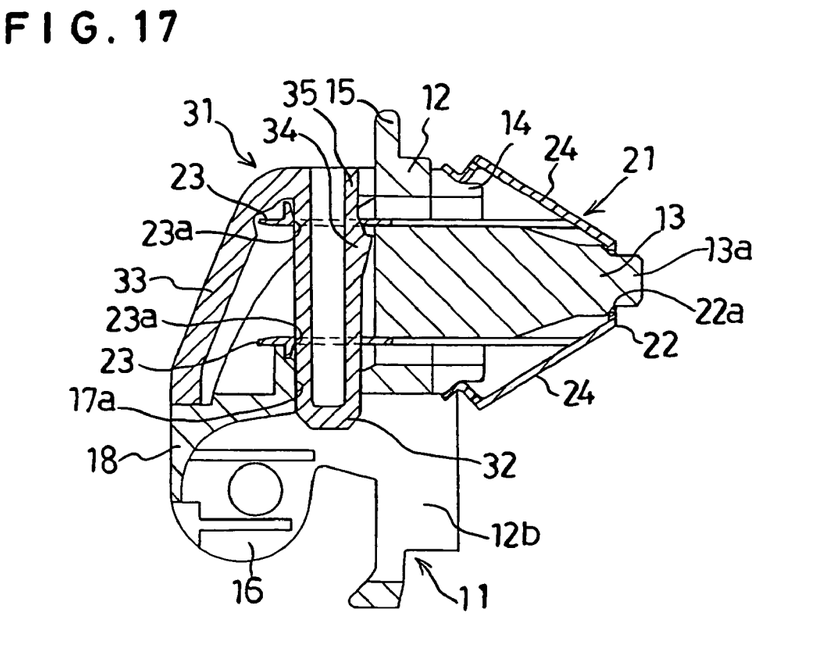
FIG. 17 is a cross section illustrating the state of assemblage of the base member, clip and engaging member.
Figure 18:
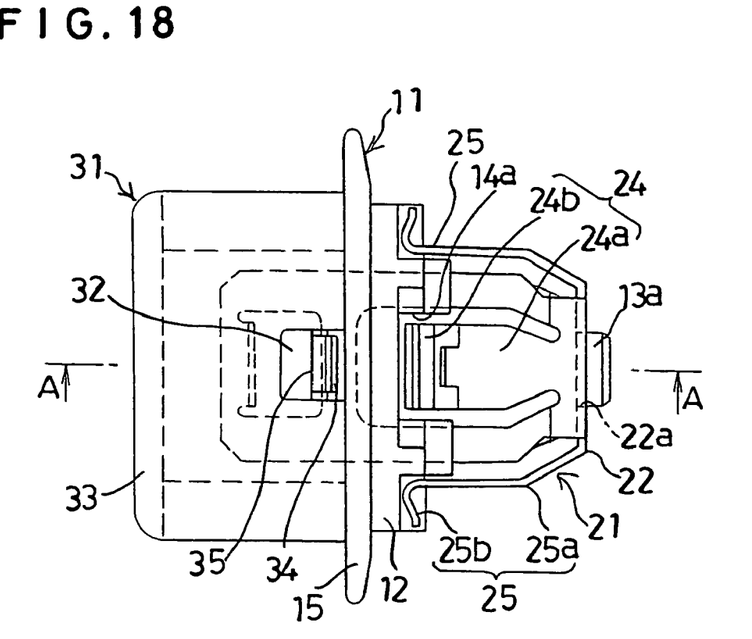
FIG. 18 is an explanatory diagram illustrating the state of assemblage of the base member, clip and engaging member.
Figure 19:
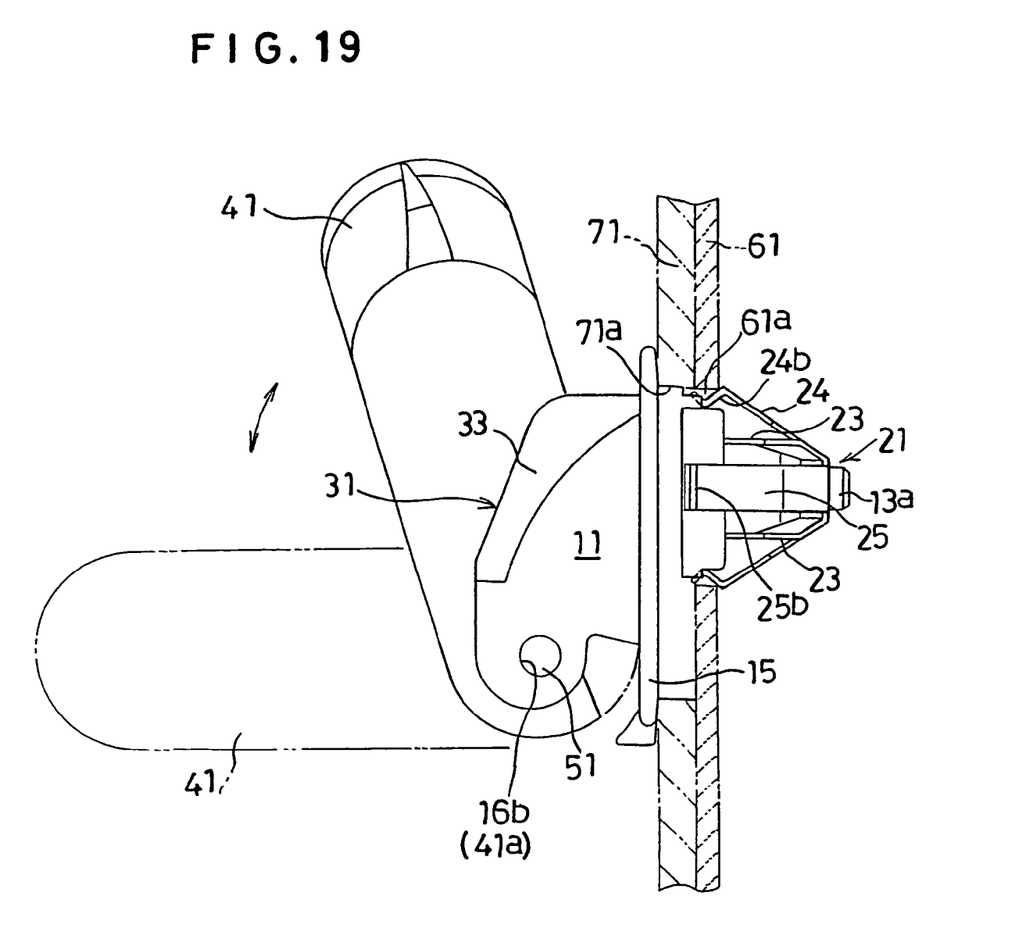
FIG. 19 is an explanatory diagram illustrating the state of attachment of the assist grip to a car body panel.

FIG. 16, FIG. 17 and FIG. 18 are explanatory diagrams illustrating the procedure for assembling the base member, clip and engaging members and FIG. 19 is an explanatory diagram illustrating the procedure for fitting the assist grip to the base member, clip and engaging members which have been assembled and the procedure for fitting them to the car body panel.

Incidentally, the cross sections of FIG. 16, FIG. 17 and FIG. 19 are the cross sections of the part corresponding to the line A-A of FIG. 18.

Figure 1:
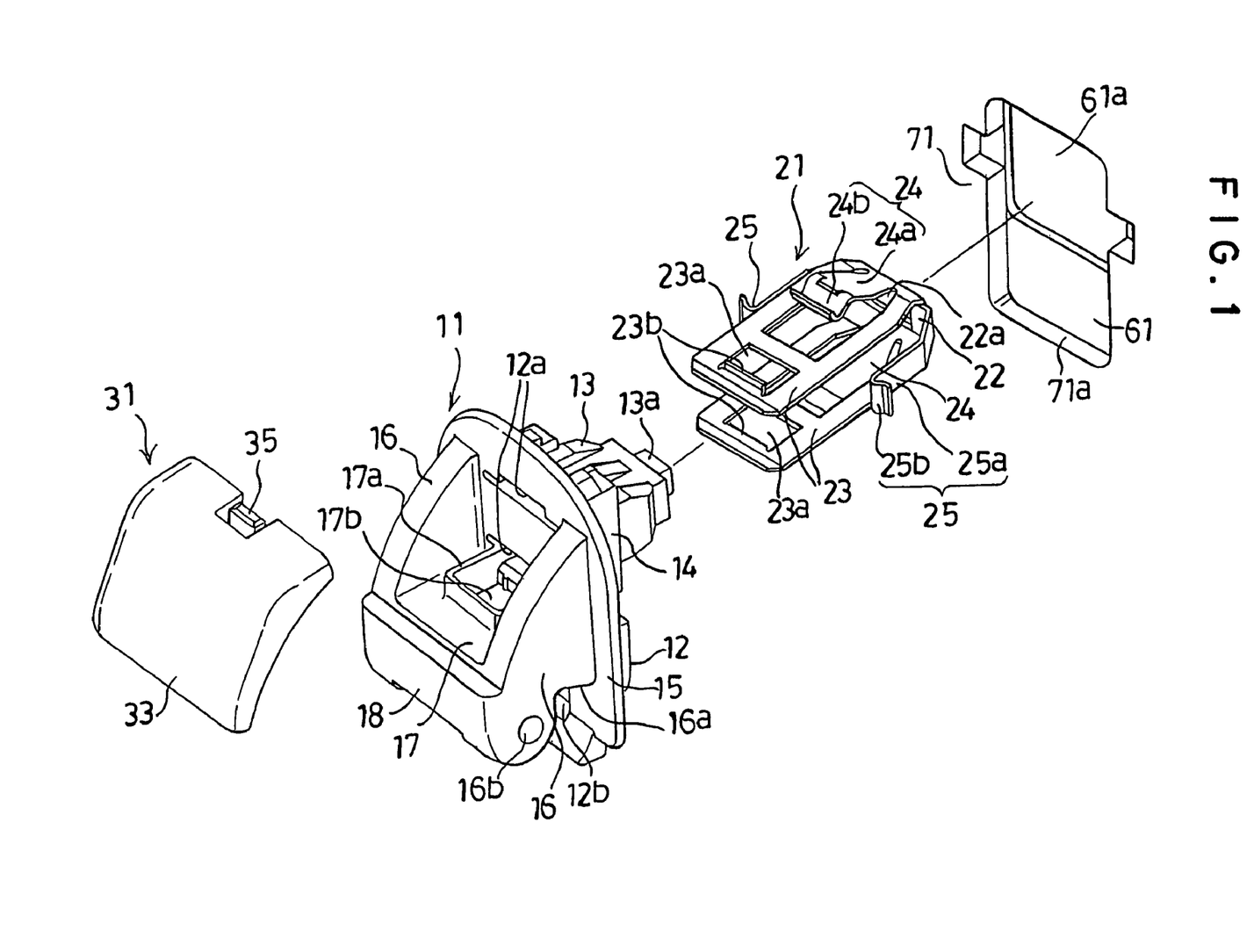
FIG. 1 is an exploded perspective view of a base member, a clip and an engaging member constituting the tying structure for an assist grip according to one embodiment the present invention.
Figure 2:
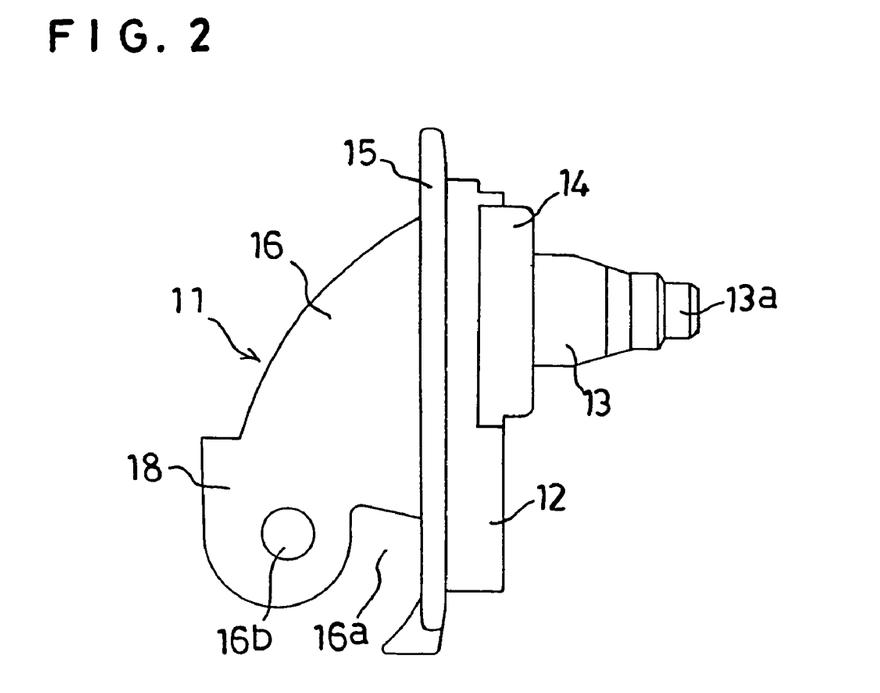
FIG. 2 is a front view of the base member.
Figure 3:
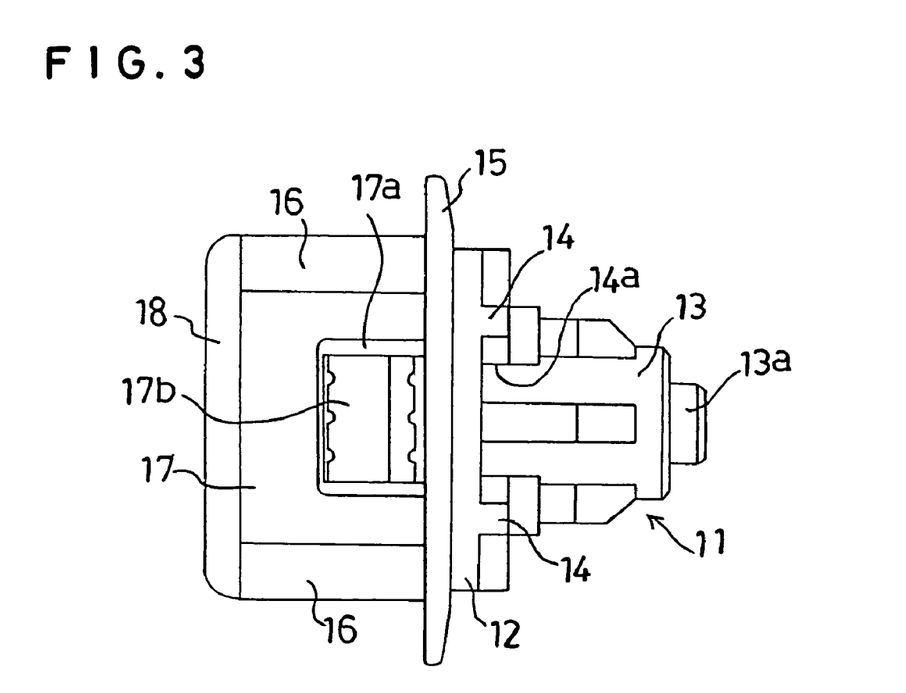
FIG. 3 is a plan view of the base member.
Figure 4:
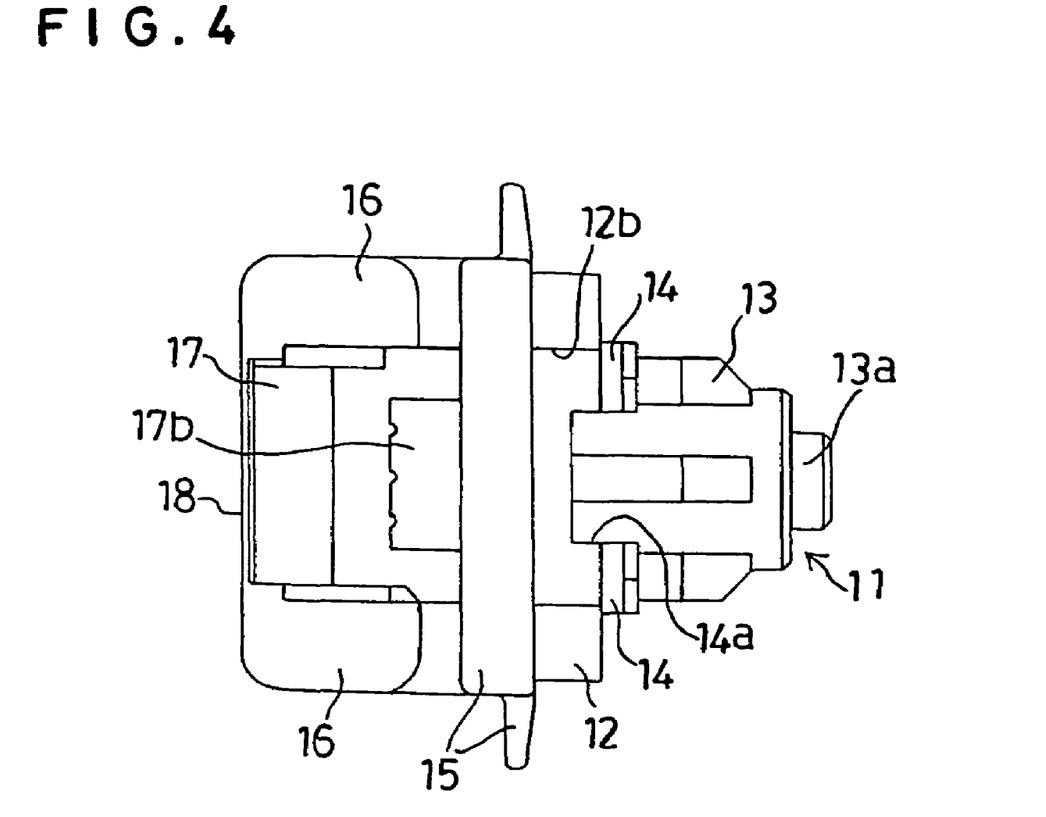
FIG. 4 is a bottom view of the base member.
Figure 5:
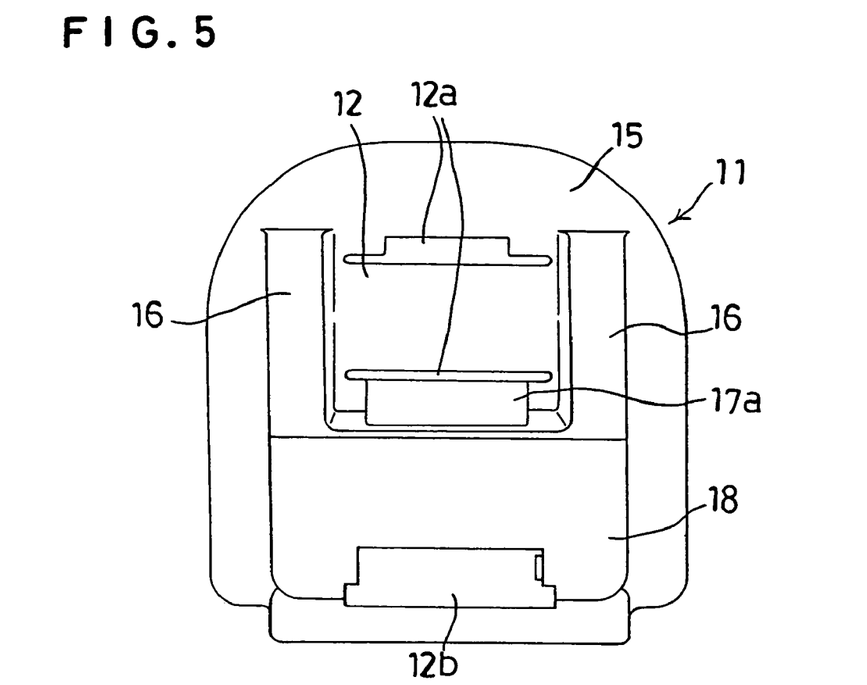
FIG. 5 is a left side view of the base member.
Figure 6:
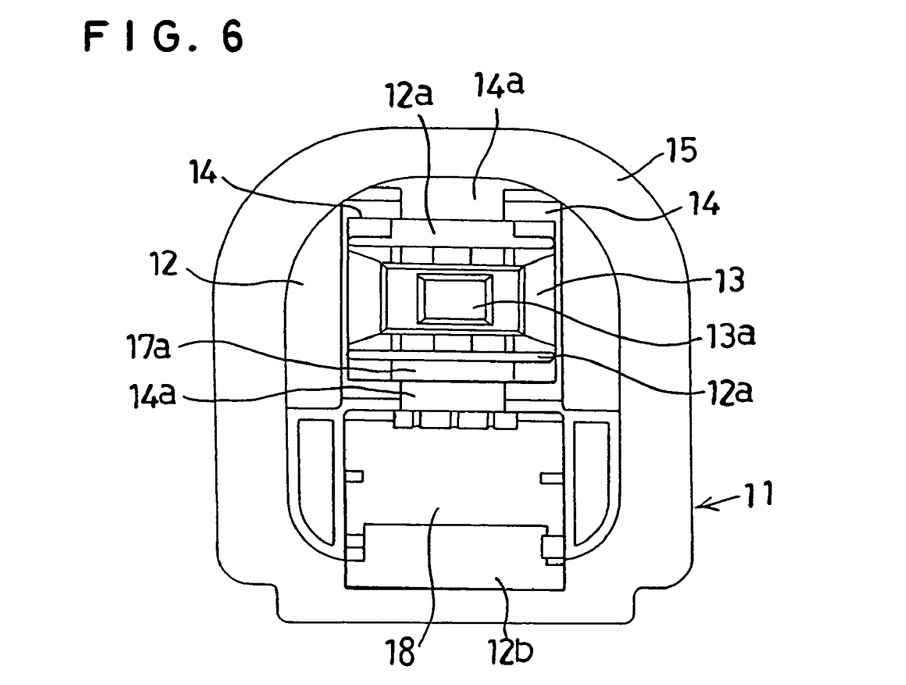
FIG. 6 is a right side view of the base member.
Figure 7:
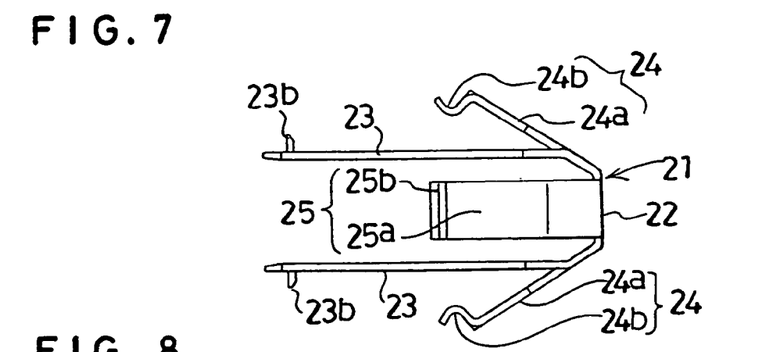
FIG. 7 is a front view of the clip.
Figure 8:
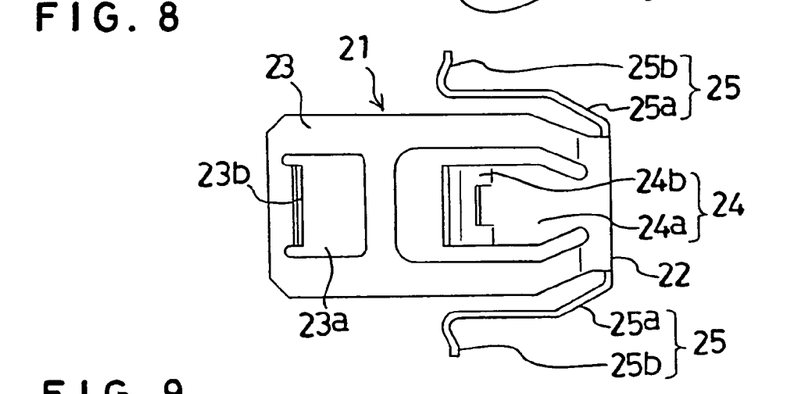
FIG. 8 is a plan view of the clip.
Figure 9:
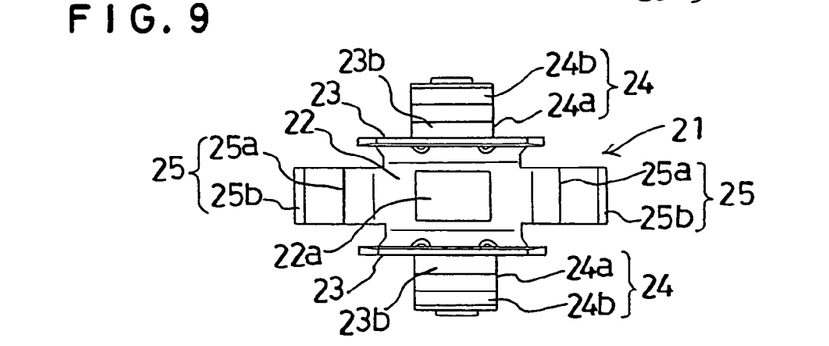
FIG. 9 is a left side view of the clip.
Figure 10:
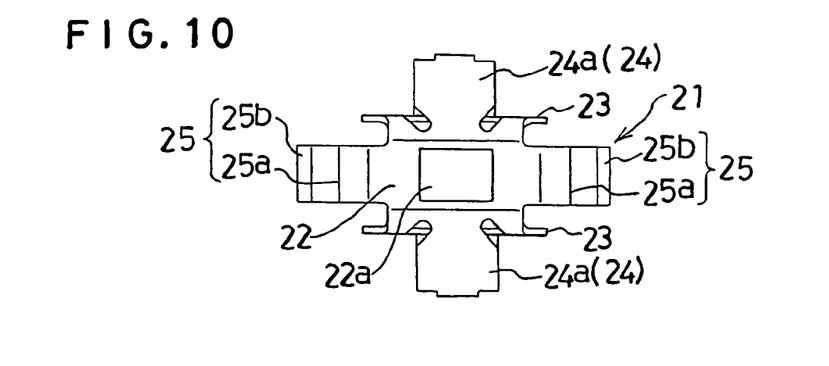
FIG. 10 is a right side view of the clip.
Figure 11:
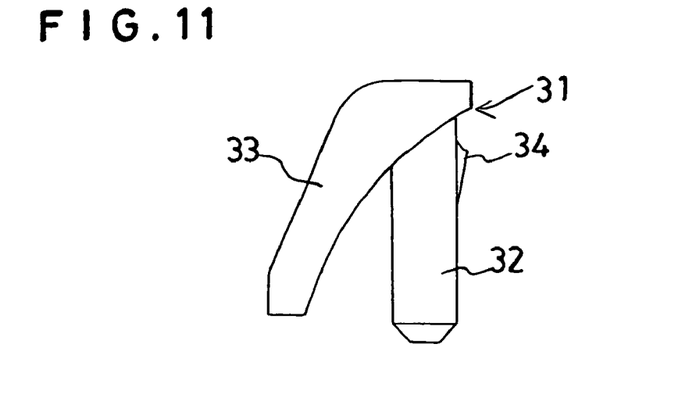
FIG. 11 is a front view of the engaging member.
Figure 12:
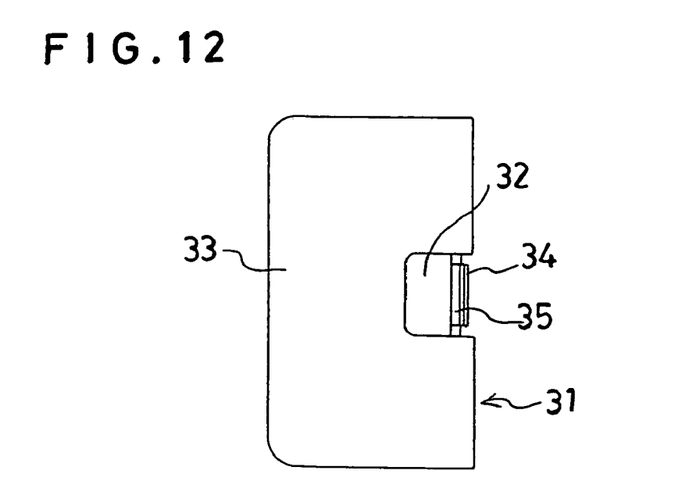
FIG. 12 is a plan view of the engaging member.
Figure 13:
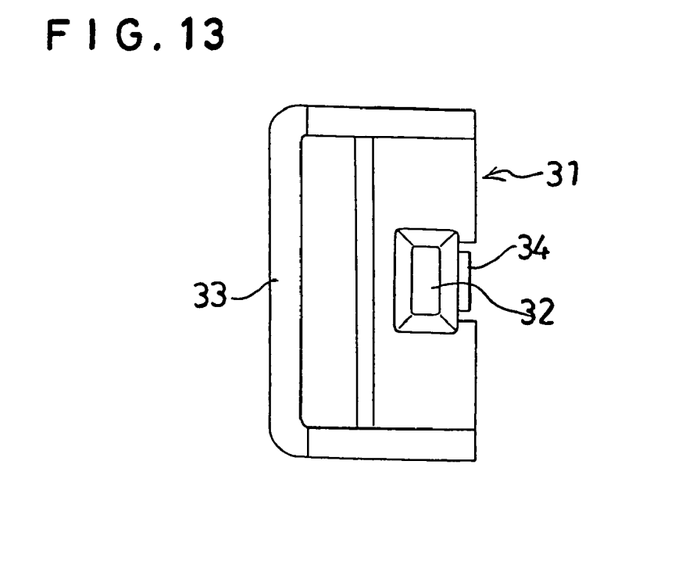
FIG. 13 is a bottom view of the engaging member.
Figure 14:
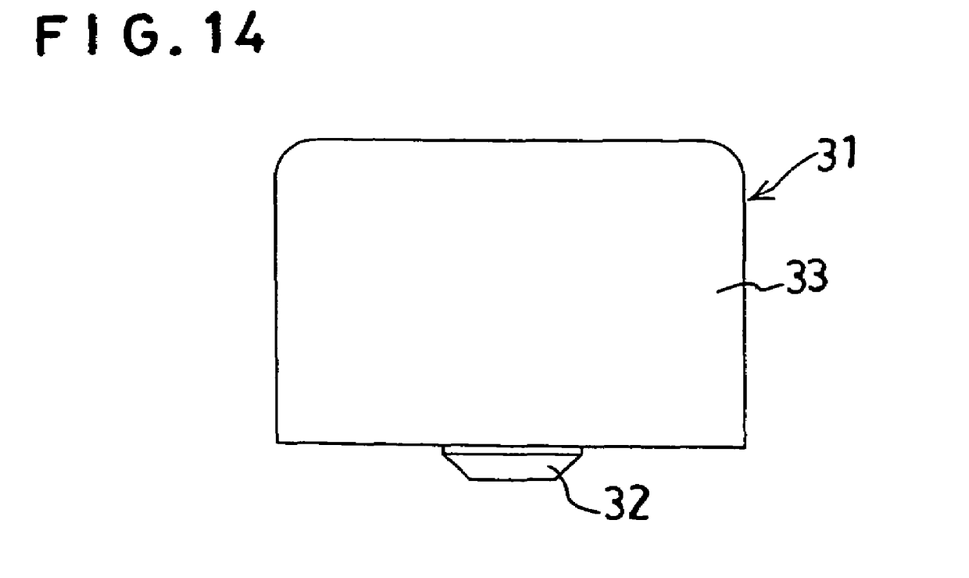
FIG. 14 is a left side view of the engaging member.
Figure 15:
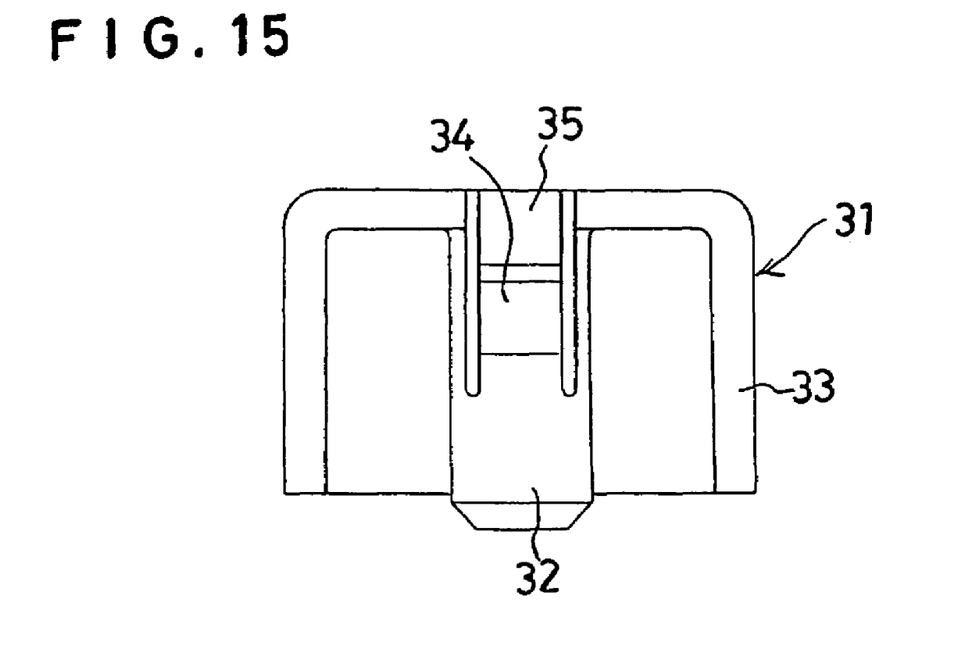
FIG. 15 is a right side view of the engaging member.

With reference to FIG. 1 and FIG. 19, reference numeral 41 denotes the assist grip made of synthetic resin and 51 denotes the supporting shaft made of a metallic material. This supporting shaft 51 is fitted to the shaft supporting holes 16b, 16b of the base member 11 and shaft supporting holes 41a, 41a of the assist grip 41 and intended to support the assist grip 41 swingably to the base member 11.

A car body panel which is denoted by 61 is furnished with a rectangular engaging hole 61a with a view to fixing the clip 21.

An interior finishing material which is denoted by 71 and which is mounted on the compartment interior side of the car body panel 61 is furnished with an inserting hole 71a so as to enable attachment of the clip 21 to the car body panel 61 and fill up the interval between the car body panel 61 and the flange part 15.

Next, the assemblage of the base member 11, clip 21 and engaging member 31 will be described below.

First, while the protruding part 13 of the base member 11 is retained by the basal part 22, the first engaging parts 23, 23 and the third engaging parts 25, 25 of the clip 21, the first engaging parts 23, 23 are inserted through and extended into the through holes 12a, 12a from the right side to effect penetration to the base member 11 and, at the same time, the projection 13a is fitted in the through hole 22a of the base part 22 to effect collision of the base part 22 against the projection 13. Consequently, the through hole 22a regulates the motion of the projection 13a (protruding part 13) in the vertical and bilateral directions, the leading terminal parts of the second engaging parts 24, 24 are positioned in the concave parts 14a, 14a, and the through holes 23a, 23a of the first engaging part 23, 23 are passed through the base member 11 and positioned on the through hole 17a as illustrated in FIG. 16.

When, in the ensuing state, the engaging part 32 of the engaging member 31 is made to confront the through holes 23a, 23a and the through hole 17a, the cover 33 is positioned on the left side, the engaging piece 34 is positioned on the right side, and subsequently the engaging part 32 is inserted into the through holes 23a, 23a as illustrated in FIG. 16, it is made possible to insert the engaging part 32 into the through holes 23a, 23a, and 17a because the engaging piece 34 is warped toward the left side by the pressure exerted by the first engaging part 23 on the upper side.

When the engaging piece 34 passes the first engaging part 23 on the upper side and, owing to the elasticity of its own, resumes the original state, namely moves toward the right side, the engaging piece 34 is enabled to contact the lower surface of the first engaging part 23 on the upper side, prevent the engaging part 32 from slipping off and, at the same time, allow the engaging part 32 to prevent the base member 11 from slipping off the clip 2 as illustrated in FIG. 17.

By enabling the engaging piece 34 to contact the lower surface of the first engaging part 23 on the upper side as described above, it is made possible to bring the lower surface of the cover 33 into collision against the upper surfaces of the pair of supporting wall parts 16, 16 and the front surface planar part 18 and the right terminal surface of the cover 33 into collision against the left side surface of the flange part 15 as illustrated in FIG. 17, with the result that the interval between the pair of supporting wall parts 16, 16 (the left side of the base member 11) will be concealed with the cover 33, and the assemblage of the base member 11, clip 21 and engaging member 31 will be completed.

Here, the expression "the front side of the base member 11" as used in the scope of claim for patent refers to the inner side of the compartment.

Next, the fitting of the assist grip 41 to the base member 11 will be described below.

First, the shaft supporting holes 41a, 41a provided at the individual terminals of the assist grip 41 and the shaft supporting holes 16b, 16b of the base member 11 are positioned on a straight line.

Then, by causing the supporting shaft 51 to be inserted through the shaft supporting hole 41a into the shaft supporting holes 16b, 16b, and 41a and fitted therein, it is made possible to attach the assist grip 41 swingably to the base member 11 as illustrated in FIG. 19.

In mounting the assist grip 41 swingably to the base member 11, it is conceivable to have an energizing member, such as a torsion spring, capable of automatically returning the assist grip 41 from the position of service indicated with a two-dot chain line to the position of storage (the position of non-use) indicated with a solid line in FIG. 19 and a damper capable of immediately rotating the assist grip 41 from the position of storage to the position of service shown in FIG. 19 inserted in the opening part 12b in the periphery of the supporting shaft 41a, though the explanation will be omitted.

Next, the attachment to the car body panel 61 of the assembly resulting from fitting the assist grip 41 to the base member 11, clip 21 and engaging member 31 will be described below.

When the clip 21 in the assembly obtained as described above is made to confront the engaging hole 61a of the car body panel 61 and the inserting hole 71a of the interior finishing material 71 as shown in FIG. 1 and the clip 21 is depressed into the car body panel 61 from the compartment side (the interior finishing material 71 side), the insertion of the clip 21 into the engaging hole 61a is attained because the second and third engaging parts 24, 24, 25 and 25 are pressed along the edge of the engaging hole 61a and bent toward the inner side.

When the colliding parts 25b, 25b collide against the front side (the compartment side) of the car body panel 61 as illustrated in FIG. 19, the fitting of the assembly will be completed because the second engaging parts 24, 24 are restored toward the out side with the elasticity of their own and the engaging parts 24b, 24b are consequently brought into engagement with the car body panel 61 and the car body panel 61 is nipped by the engaging parts 24b, 24b and the colliding parts 25b, 25b.

When the assembly is attached to the car body panel 61 as described above, the interval between the car body panel 61 and the flange part 15 will be filled up with the interior finishing material 71.

Next, the removal of the assembly from the car body panel 61 will be described herein below.

First, the engagement between the engaging piece 34 and the first engaging part 23 on the upper side is released by rotating the assist clip 41 toward the position of service as indicated with a two-dot line in FIG. 19 and warping the removing part 35 with a nail toward the left side in the bearings of FIG. 17.

The removal of the engaging member 31 is attained by moving the engaging member 31 toward the upper side as shown in FIG. 16 while keeping the ensuing state intact.

By removing the engaging member 31 as described above and consequently canceling the fixation of the base member 11 to the clip 21, it is made possible to extract the assist grip 41 and the base member 11 from the clip 21.

Then, by bringing the tip of a tool into engagement with the engaging parts 24b, 24b of the second engaging parts 24, 24 and bending the second engaging parts 24, 24 toward the inner side and consequently canceling the engagement between the engaging parts 24b, 24b and the car body panel 61, it is made possible to remove the clip 21 from the car body panel 61.

According to the embodiment of this invention described above, since the structure for tying the base member 11 supporting the assist grip 41 swingably thereon to the car body panel 61 is attained by causing the clip 21 having the base member 11 fitted thereto with the engaging member 31 to engage with the car body panel 61, the work of tying the base member 11 of high reliability can be carried out with high efficiency of operation without requiring use of such a jig as is needed when a screw is indispensable or necessitating management of tightening torque.

Then, since the engaging member 31 is provided with the cover 33, the left side surface (front side surface) of the base member 11 can be concealed so as not to expose the clip 21. Further, the cover also conceals the first engaging part 23 while the assist grip 41 is being used and, therefore, contributes to the enhancement of design.

Further, since the second engaging parts 24, 24 are each formed of a plurality of elastic pieces 14a, 14a which are diverged from their proximal terminals toward their distal terminals, they can be attached powerfully to the car body panel 61.

Since the clip 21 is provided with the retaining part serving to retain the protruding part 13 thrust toward the right side (the rear surface side) of the base member 11, it can retain the base member 11 so fast as to prevent it from moving.

Since the retaining part is provided with the through hole 22a which is capable of regulating the motion of the projection 13a provided in the protruding part 13, it can retain the base member 11 so fast as to prevent it from clattering.

Since the engaging member 31 is provided with the removing part 35 which is capable of removing the engaging member 31 from the clip 21, the operation of the removing part 35 enables the engaging member 31 to be simply removed from the clip 21 and put to reuse.

The clip 21 is made of a metallic material and, therefore, enabled to exalt the strength of attachment.

Though the embodiment mentioned above has contemplated forming the base member 11, engaging member 31 and assist grip 41 each of a synthetic resin and the clip 21 and supporting shaft 51 each of a metallic material, they do not need to be particularly limited to these materials so long as they are capable of functioning similarly.

The clip 21 and supporting shaft 51 each are preferably made of a metallic material where they are enabled to secure strength and stiffness as required in spite of a decrease in thickness or diameter.

Though the case of providing the third engaging part 25 has been cited, the function can be similarly fulfilled without requiring the provision of the third engaging part 25.

INDUSTRIAL APPLICABILITY

According to this invention, since the structure for tying the base member supporting the assist grip swingably thereon to the car body panel is attained by causing the clip having the base member fitted thereto with the engaging member to engage with the car body panel, the work of tying the base member of high reliability can be carried out with high efficiency of operation without requiring use of such a jig as is needed when a screw is indispensable or necessitating management of tightening torque.

Since the engaging member is provided with the cover, the front side surface of the base member can be concealed so as not to expose the clip and the cover also conceals the first engaging part while the assist grip is being used and, therefore, contributes to the enhancement of design.

Further, since the second engaging part is formed of a plurality of elastic pieces which are diverged from their proximal terminals toward their distal terminals, it can be powerfully attached to the car body panel.

Since the clip is provided with the retaining part which is capable of retaining the protruding part thrust toward the front surface side of the base member, it can retain the base member so fast as to prevent it from moving.

Since the retaining part is provided with the regulating part which regulates the motion of the projecting part, it can retain the base member so fast as to prevent it from clattering.

Since the engaging member is provided with the removing part which is capable of removing the engaging member from the clip, the operation of the removing part enables the engaging member to be simply removed from the clip and put to reuse.

Further, since the clip is made of a metallic material, it is enabled to exalt its own strength of attachment.

The invention claimed is:

1. A tying structure for an assist grip of a car body panel, comprising:
   - a base member supporting a swingable assist grip and provided therein with a through hole and with a protruding part thrust toward a rear face thereof;
   - a metallic clip which penetrates the through hole,
   - said metallic clip being provided with a first engaging part for engagement with said base member, a second engaging part for engagement with the car body panel, and a retaining part for retaining the protruding part of the base member;
   - said first engaging part being provided in a distal terminal side part thereof penetrating said through hole in an outside-inside insertion direction and protruding toward a front side of the base member with a through hole penetrating said distal terminal part in a direction orthogonal to the insertion direction, and
   - an engaging member comprising an engaging part inserted into said through hole and enabled to prevent said base member from slipping off said metallic clip and a cover for covering the front side of said base member.

2. A tying structure for an assist grip according to claim 1, wherein said second engaging part of said clip is formed of a plurality of elastic pieces each diverging from a proximal terminal toward a distal terminal.

3. A tying structure for an assist grip according to claim 2, wherein said retaining parts are provided with a through hole for inserting said protruding part therein as a regulating part for regulating motion of said protruding part.

4. A tying structure for an assist grip according to any one of claims 1 to 3, wherein said engaging member is provided with an engaging piece for engagement with said first engaging part and a removing part for removing the engaging member itself from said clip.

* * * * *